Patented Nov. 8, 1932

1,886,759

UNITED STATES PATENT OFFICE

BERT S. TAYLOR, OF AKRON, OHIO, ASSIGNOR TO THE B. F. GOODRICH COMPANY, OF NEW YORK, N. Y., A CORPORATION OF NEW YORK

OIL-RESISTING RUBBER ARTICLE AND METHOD OF MAKING THE SAME

No Drawing.  Application filed June 19, 1929. Serial No. 372,214.

This invention relates to the art of manufacturing rubber and has as its principal object to provide a method for protecting rubber goods or similar articles from the deteriorating effect of oils and corrosive chemicals.

Many elastic articles such as transmission or conveyor belts, hose, boots and shoes, rubber insulation, etc. are subjected to the swelling and softening action of oils or of volatile solvents, the effect of which is to distort and to weaken the rubber, either permanently or until the solvent and swelling agent has evaporated. Previous attempts to render such articles oil-proof by the application of a protective coating have failed because the coating did not adhere to the rubber or other base, or because it was not sufficiently elastic and extensible to flex with the base.

This invention consists in coating elastic articles with a thin coat of a solution of a heat-plastic rubber isomer, and vulcanizing the surface of said coating by applying vulcanizing agents thereto.

The heat-plastic rubber isomer which constitutes the coating is preferably a tough heat-plastic balata-like rubber isomer, such as that prepared by the reaction of rubber with sulphonic acids, and described by Harry L. Fisher in the United States Patent No. 1,605,180, granted November 2, 1926. These rubber isomers have physical properties varying from those of vulcanized rubber, to those of hard balata, or even of shellac. When purified, they contain only carbon and hydrogen in the same ratio as the rubber from which they were prepared, but are chemically less unsaturated than rubber. They may be prepared by various different methods, of which that disclosed in the above-mentioned patent is an illustration, hence the term "tough," heat-plastic rubber "isomers" will hereinafter be employed to include substances which contain carbon and hydrogen in the same ratio as rubber, but which are chemically less unsaturated than rubber, regardless of the particular method by which they are prepared. The rubber isomer may be softened by heat and rolled or spread on the surface of the article which is to be protected, but is preferably applied in the form of a solution. For example, the article is dipped in a 15% solution of benzol of the tough balata-like heat-plastic rubber isomer described in Fisher's above mentioned patent. The coating is dried and then vulcanized as hereinafter more fully described.

The vulcanization of the surface of the coating has as its object to render said surface layer completely insoluble in the common rubber solvents such as benzol, gasoline, carbon tetrachloride, etc., as well as in the non-volatile oils, such as animal, vegetable, or mineral oils. This result is best accomplished when the degree of vulcanization is greatest at the immediate surface of the coating, diminishing progressively toward the surface of attachment between the rubber or other base and the coating material. That portion of the coating which is in direct contact with the elastic base therefore retains to the fullest extent its natural elasticity and extensibility and is enabled to maintain a relationship of firm and permanent adhesion therewith.

The coating, therefore, is vulcanized by the application of vulcanizing agents to the exterior surface thereof, in such a manner as to confine the vulcanization largely to the said surface. Sulphur chloride is particularly adapted for employment as the vulcanizing agent for such coatings, but other substances which function in the same or a similar manner may be substituted therefor with very good results, the products obtained in some cases being notably superior to those obtained by employing sulphur chloride alone. For example, any one of the following agents may be employed, either alone in the liquid state, or in solution, or in the vapor state if it is sufficiently volatile: sulphur chloride, sulphur bromide, sulphur oxychloride, selenium chloride, selenium oxychloride, selenium oxybromide, tellurium chloride, phosphorus sulphide, hydrogen persulphide, or even sulphur itself, or a mixture of sulphur with an accelerator of vulcanization, or mixtures of two or more of such vulcanizing agents. The treatment is continued until the surface is vulcanized to such a state that it is substantially unaffected by oils, either volatile or non-volatile, but remains sufficiently elastic and extensible to conform to any distortion which is undergone by the base.

When the coating is applied to fabric-reenforced articles, such as belts, the degree of extension is so slight that the rubber isomer alone is sufficiently elastic, but coatings for other articles which of necessity undergo a relatively great extension are preferably modified by the addition of a plasticizer such as castor oil, benzyl benzoate, tricresyl phosphate, dibutyl phthalate, etc. If desired, the properties of the coating may be further modified by incorporating therein pigments, fillers, or diluents.

The invention will be described with reference to a specific embodiment, namely, a belt such as a power transmission belt or conveyor belt. The belt may be built up in the usual manner by coating successive plies of cotton duck or other stout fabric with a vulcanizable rubber composition, superimposing the plies, and vulcanizing the belt under tension in a press. Preferably the exterior surfaces of the belt are not completely covered with rubber, but the fabric is left partially exposed to serve as a base for the coating. Such belts are known in the art as "friction fabric" surface belts.

The vulcanized belt is coated with a uniform coating of the rubber isomer by passing it through a trough or tank containing the rubber isomer in solution in a volatile solvent. The coating is allowed to dry and is then vulcanized by passing it through a second trough or tank containing a 2½% solution of sulphur chloride in benzol at such a rate of speed that each portion of the surface is immersed therein approximately ½ minute. After the solvent has evaporated and a short period of time, approximately 15 minutes, has passed, the belt is again passed through the sulphur chloride bath as before. After drying, the belt is ready for use.

The finished belt is quite as flexibe as the same belt without the oil-resisting coating. The coating is extremely firmly adherent and will not crack, chip, or peel. It effectually protects the rubberized base from oils and volatile hydrocarbon solvents by preventing their penetration into the rubber. The vulcanized rubber isomer coating is not only not appreciably affected itself by such oils, etc., but is practically impermeable and does not allow them to diffuse through to the rubber. On the other hand, the coating is extremely tough and durable, and protects the surface for quite an extended period of time, even when subjected to frictional wear. If the coating should be mechanically destroyed or removed, as by abrasion, it is readily replaced by another coating, which is applied in the same manner.

It has been found that more durable, highly impermeable, and at the same time, more elastic coatings, are obtained by substituting a 4½% solution of selenium oxychloride for the solution of sulphur chloride mentioned in the above example. Such substitution will prove particularly valuable for the treatment of belts which are subjected to unusually severe flexing, or to excessive quantities of oil.

The vulcanized rubber isomer coatings are not only highly resistant to penetration by oils, but are practically unaffected by most acids, alkalies, salts, etc. Articles provided with such coatings may therefore be employed almost universally, since they are capable of withstanding successfully the action of many reagents or combinations of reagents which have heretofore been considered as utterly destructive to rubber articles.

The hereinabove-described coatings are obviously applicable not only to belts, but to any articles which require a coating to protect them from oils or other hydrocarbon substances, corrosive acids, alkalies, salts, etc. Such articles may include rubber hose, boots or shoes, rubber-lined pipes or tanks, rubber-coated articles of various descriptions, gas masks, etc., as well as articles made from other materials.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

I claim:

1. The method of protecting surfaces which comprises coating said surfaces with a layer of a tough, heat-plastic rubber isomer, and subjecting the coating to the action of vulcanizing agents.

2. The method of protecting surfaces of elastic articles which comprises coating the said surfaces with a layer of a tough, heat-plastic rubber isomer, and applying vulcanizing agents to the coating to effect a surface vulcanization thereof.

3. The method of protecting the surfaces of rubber articles which comprises applying to the said surfaces a coating of a tough, heat-plastic rubber isomer, and treating said coating with a compound consisting of an element of the group consisting of the halogens and phosphorus combined with an element of the group consisting of sulphur, selenium, and tellurium.

4. The method of protecting the surfaces of rubber articles which comprises applying to the said surfaces a coating of a tough, heat-plastic rubber isomer, and treating said coating with a compound selected from the class consisting of sulphur chloride, sulphur bromide, sulphur oxychloride, selenium chloride, selenium oxychloride, selenium oxybromide, and phosphorus sulphide.

5. The method of protecting the surfaces of fabric-reenforced rubber articles which comprises applying to the said surfaces a coating of a tough, heat-plastic rubber isomer, and treating said coating with sulphur chloride to effect a surface vulcanization thereof.

6. An article protected by a coating of a tough, heat-plastic rubber isomer, the said coating being vulcanized to an extent diminishing progressively inwardly from the surface thereof.

7. A rubber article protected by a firmly adherent coating of a tough, heat-plastic rubber isomer, the said coating being vulcanized to an extent diminishing progressively inwardly from the surface thereof.

8. A rubber article protected by a firmly adherent coating of a tough, heat-plastic rubber isomer, the said coating containing chemically combined therewith an element of the sulphur group and an element of the halogen group, the proportion of the said elements in the coating diminishing progressively inwardly from the surface thereof.

9. A fabric-reenforced rubber article protected by a firmly adherent coating of a tough, heat-plastic rubber isomer, the said coating containing chemically combined therewith the elements sulphur and chlorine, the proportion of said elements in the coating diminishing progressively inwardly from the surface thereof.

10. The method of protecting the surfaces of fabric-reenforced rubber articles which comprises applying to the said surfaces a coating of a tough, heat-plastic rubber isomer, and treating said coating with selenium oxychloride to effect a surface vulcanization thereof.

11. A fabric-reenforced rubber article protected by a firmly adherent coating of a tough, heat-plastic rubber isomer, the said coating containing chemically combined therewith the elements of selenium oxychloride, the proportion of said elements in the coating diminishing progressively inwardly from the surface thereof.

In witness whereof I have hereunto set my hand this 15th day of June, 1929.

BERT S. TAYLOR.

CERTIFICATE OF CORRECTION.

Patent No. 1,886,759. November 8, 1932.

BERT S. TAYLOR.

It is hereby certified that error appears in the printed specification of the above numbered patent requiring correction as follows: Page 1, line 52, for "of" first occurrence read "in"; and that the said Letters Patent should be read with these corrections therein that the same may conform to the record of the case in the Patent Office.

Signed and sealed this 16th day of May, A. D. 1933.

M. J. Moore.

(Seal) Acting Commissioner of Patents.